(12) United States Patent
Morozov

(10) Patent No.: US 9,158,799 B2
(45) Date of Patent: Oct. 13, 2015

(54) STORING AND RETRIEVING CONTEXT SENSITIVE DATA IN A MANAGEMENT SYSTEM

(71) Applicant: BMC Software, Inc., Houston, TX (US)

(72) Inventor: Vitaly Morozov, Irvine, CA (US)

(73) Assignee: BMC SOFTWARE, INC., Houston, TX (US)

(*) Notice: Subject to any disclaimer, the term of this patent is extended or adjusted under 35 U.S.C. 154(b) by 218 days.

(21) Appl. No.: 13/804,694

(22) Filed: Mar. 14, 2013

(65) Prior Publication Data

US 2014/0279992 A1   Sep. 18, 2014

(51) Int. Cl.
G06F 7/00      (2006.01)
G06F 17/30     (2006.01)

(52) U.S. Cl.
CPC ................. G06F 17/30303 (2013.01)

(58) Field of Classification Search
USPC ........................................................ 707/706
See application file for complete search history.

(56) References Cited

U.S. PATENT DOCUMENTS

| | | |
|---|---|---|
| 5,761,505 A | 6/1998 | Golson et al. |
| 5,948,055 A | 9/1999 | Pulsipher et al. |
| 5,991,877 A | 11/1999 | Luckenbaugh |
| 6,212,266 B1 | 4/2001 | Busuioc |
| 6,266,513 B1 | 7/2001 | Briancon |
| 6,336,138 B1 | 1/2002 | Caswell et al. |
| 6,496,838 B1 | 12/2002 | Zamora-McKelvy et al. |
| 6,820,090 B2 | 11/2004 | Chambers et al. |
| 6,836,798 B1 | 12/2004 | Adams |
| 7,003,402 B2 | 2/2006 | Christie et al. |
| 7,082,426 B2 | 7/2006 | Musgrove et al. |
| 7,146,380 B2 | 12/2006 | Schaepe et al. |
| 7,155,427 B1 | 12/2006 | Prothia et al. |
| 7,395,256 B2 | 7/2008 | Ji et al. |
| 2002/0002555 A1 | 1/2002 | Wolman et al. |
| 2003/0126108 A1 | 7/2003 | Martino et al. |
| 2004/0019672 A1 | 1/2004 | Das et al. |
| 2004/0143600 A1 | 7/2004 | Musgrove et al. |
| 2004/0220963 A1 | 11/2004 | Chen et al. |
| 2005/0038889 A1 | 2/2005 | Frietsch |
| 2005/0080613 A1 | 4/2005 | Colledge et al. |
| 2005/0216433 A1 | 9/2005 | Bland et al. |
| 2005/0234973 A1 | 10/2005 | Zeng et al. |
| 2006/0123393 A1 | 6/2006 | Atkins et al. |

(Continued)

OTHER PUBLICATIONS

"BMC Atrium CMBD 7.6.00; Normalization and Reconciliation Guide", Sep. 2009, pp. 1-148.

(Continued)

*Primary Examiner* — Alex Gofman
*Assistant Examiner* — Muluemebet Gurmu
(74) *Attorney, Agent, or Firm* — Brake Hughes Bellermann LLP

(57) ABSTRACT

A management system may include a reconciliation engine configured to reconcile a first instance of a resource object from a first data provider and a second instance of the resource object from a second data provider to obtain a reconciled resource object, and store the first instance, and second instance, and the reconciled resource object in datasets. The management system may include a context sensitive query engine configured to receive a context-sensitive query including context information identifying a source originally providing context sensitive data associated with a context-sensitive attribute, and retrieve the context sensitive data from one or more of the datasets based on the context information.

20 Claims, 8 Drawing Sheets

(56) References Cited

U.S. PATENT DOCUMENTS

| | | | |
|---|---|---|---|
| 2006/0136585 | A1 | 6/2006 | Mayfield et al. |
| 2006/0179124 | A1 | 8/2006 | Stefaniak et al. |
| 2008/0021917 | A1 | 1/2008 | Baker et al. |
| 2008/0183724 | A1 | 7/2008 | Mueller |
| 2009/0094462 | A1 | 4/2009 | Madduri |
| 2009/0319932 | A1 | 12/2009 | Robinson et al. |
| 2010/0161577 | A1 | 6/2010 | Morozov |
| 2011/0238637 | A1 | 9/2011 | Morozov et al. |
| 2012/0259812 | A1 | 10/2012 | Rangarajan et al. |
| 2013/0007011 | A1* | 1/2013 | Setlur et al. ............. 707/748 |

OTHER PUBLICATIONS

"BMC Atrium CMDB 7.6.00; User's Guide", Sep. 2009, pp. 1-78.
"BMC Atrium Core 7.6.00; Concepts and Planning Guide", Sep. 2009, pp. 1-164.
Extended European Search Report received for European Patent Application No. 05257482.9, mailed on Apr. 3, 2006, 8 pages.
"The Four Challenges of Customer-Centric Data Warehousing", Carleton Corporation, Nov. 1998, 16 pages.
Final Office Action received for U.S. Appl. No. 12/570,628, mailed on Feb. 21, 2012, 13 pages.
Advisory Action received for U.S. Appl. No. 12/570,628, mailed on Apr. 25, 2012, 3 pages.
Non Final Office Action received for U.S. Appl. No. 12/570,628, mailed on Sep. 7, 2011, 12 pages.
Advisory Action received for U.S. Appl. No. 12/860,334, mailed on Nov. 29, 2012, 3 pages.
Non Final Office Action received for U.S. Appl. No. 12/860,334, mailed on Jun. 22, 2012, 13 pages.
Response to Non Final Office Action filed for U.S. Appl. No. 12/860,334, on Sep. 19, 2012, 15 pages.
Final Office Action received for U.S. Appl. No. 12/860,334, mailed on Oct. 5, 2012, 16 pages.
Response to Final Office Action filed for U.S. Appl. No. 11/295,363, on Jan. 18, 2013, 14 pages.
Response to Final Office Action filed for U.S. Appl. No. 12/860,334, on Nov. 21, 2012, 13 pages.
Non Final Office Action received for U.S. Appl. No. 13/082,194, mailed on Jun. 21, 2012, 24 pages.
Response to Non Final Office Action filed for U.S. Appl. No. 13/082,194, on Sep. 19, 2012, 15 pages.
Final Office Action received for U.S. Appl. No. 13/082,194, mailed on Oct. 17, 2012, 38 pages.
Response to Final Office Action filed for U.S. Appl. No. 13/082,194, on Nov. 21, 2012, 16 pages.
Advisory Action received for U.S. Appl. No. 13/082,194, mailed on Dec. 7, 2012, 6 pages.
Final Office Action received for U.S. Appl. No. 11/204,189, mailed on Feb. 22, 2010, 11 pages.
Advisory Action received for U.S. Appl. No. 11/204,189, mailed on May 4, 2010, 3 pages.

* cited by examiner

Provider1 Launch in context query example
https://mysyte.com/someplace/myRes.aspx?k=PersonKey."$PersonID$"Prov1DS$"%20otherparam=$SomeOtherProperty$" —108-1

Provider2 Launch in context query example
https://mysyte2.com/someplace/myRes.aspx?param1="$PersonID@Prov2DS$"%20otherparam=$SomeOtherProperty2$" —108-2

Provider3 Launch in context query example
https://mysyte3.com/someplace/myRes.aspx?EmployeeKey="$PersonID@Prov3DS$"%20otherparam=$SomeOtherProperty3$" —108-3

Query with cross provider select example: "Select all instances of person where
$property1$=="$PersonID@Prov2DS"?Prov2DS":DEFAULT"$ —108-4

FIG. 2B

STORING AND RETRIEVING CONTEXT SENSITIVE DATA IN A MANAGEMENT SYSTEM

TECHNICAL FIELD

The present disclosure relates generally to storing and retrieving context sensitive data in a management system.

BACKGROUND

A typical enterprise may have a plurality of different data sources (providers) that populate data into a configuration management database (CMDB). The data may be stored into different data partitions (e.g., datasets) and later reconciled into one or more target partitions (e.g., pre-production dataset, production dataset, etc.) Generally, the reconciliation process may include identifying instances of resource objects, and then merging those instances to create reconciled resource objects. The reconciliation process may be based on various algorithms including but not limited to identification rules and/or merge precedence rules, for example. As a result of such merge precedence rules, it may be possible that attribute content from a specific data source may not be presented in the target dataset.

Currently, the CMDB may allow the retrieval of data from any data partition, but in order to combine data from more than one partition, two or more separate queries are executed and then transformation/merge operations may be applied on the results. However, the conventional storage/retrieval operations of the CMDB system makes the CMDB system more difficult to use, and as a result, people create workarounds by adding new attributes to resource objects in order to ensure that provider-specific data from the provider sources are included into the target partition. Therefore, the conventional approach is not entirely scalable and may not guarantee that the provider-specific data from a particular data provider will remain intact in the target dataset.

SUMMARY

The embodiments provide a management system for storing and retrieving data. The management system including at least one processor, and a non-transitory computer-readable storage medium including instructions executable by the at least one processor, the instructions configured to implement a reconciliation engine and a context sensitive query engine. The reconciliation engine may be configured to reconcile a first instance of a resource object from a first data provider and a second instance of the resource object from a second data provider to obtain a reconciled resource object. Each of the first instance and the second instance may include a context-sensitive attribute and data associated with the context-sensitive attribute that is specific to a respective data provider. The reconciliation engine may be configured store the first instance in a first provider data partition associated with the first data provider, the second instance in a second provider data partition associated with the second data provider, and the reconciled resource object in a target data partition. The context sensitive query engine may be configured to receive a context-sensitive query. The context-sensitive query may include context information identifying a source originally providing the data associated with the context-sensitive attribute.

The context sensitive query engine may be configured to query at least one data partition among a plurality of data partitions in response to the query. The plurality of data partitions may include the first provider data partition, the second provider data partition, and the target data partition. The context sensitive query engine may be configured to retrieve provider-specific data associated with the context-sensitive attribute that corresponds to the identified source from the at least one data partition based on the context information.

The first and second instances of the resource object and the reconciled resource object may share a common key. The context sensitive query engine may be configured to query the target data partition for the reconciled resource object corresponding to the context-sensitive attribute and obtain the common key from the reconciled resource object. The context sensitive query engine may be configured to query the first provider data partition for the first instance using the common key if the context information specifies the first data provider, and obtain the provider-specific data associated with the context-sensitive attribute from the first instance. The context sensitive query engine may be configured to query the second provider data partition for the second instance using the common key if the context information specifies the second data provider and obtain the provider-specific data corresponding to the context-sensitive attribute from the second instance. In one embodiment, the common key may include a reconciliation identifier.

The reconciliation engine may include a context-sensitive merging unit configured to merge the data associated with the context-sensitive attribute from both the first instance and the second instance to create reconciled data for the context-sensitive attribute. The reconciled data may include first provider-specific data for the first data provider, and second provider-specific data for the second data provider. Also, the reconciled data may include the first provider-specific data, the second provider-specific data, and default data corresponding to results of a reconciliation operation on the context-sensitive attribute.

The context sensitive query engine may be configured to query the target data partition for the reconciled resource object, and obtain the first provider-specific data from the reconciled data if the context information specifies the first data provider. Also, the context sensitive query engine may be configured to query the target data partition for the reconciled resource object, and obtain the second provider-specific data from the reconciled data if the context information specifies the second data provider.

The reconciliation engine may include a merging unit configured to merge the data associated with the context-sensitive attribute from both the first instance and the second instance according to a reconciliation rule to create reconciled data for the context-sensitive attribute. The reconciled data may include one of first provider-specific data for the first data provider and second provider-specific data for the second data provider.

The context sensitive query engine may be configured to query the target data partition for the reconciled resource object to obtain a reconciliation identifier corresponding to the reconciled resource object. The context sensitive query engine may be configured to query the first provider data partition if the context information specifies the first data provider using the reconciliation identifier and obtain the provider-specific data associated with the context-sensitive attribute from the first instance. Also, the context-sensitive query engine may be configured to query the second provider data partition if the context information specifies the second data provider using the reconciliation identifier and obtain the provider-specific data associated with the context-sensitive attribute from the second instance.

A non-transitory computer-readable medium storing instructions that when executed cause at least one processor to store and retrieve data from a management system. The instructions may include instructions to reconcile a first instance of a resource object from a first data provider and a second instance of the resource object from a second data provider to obtain a reconciled resource object. Each of the first instance and the second instance may include a context-sensitive attribute and data associated with the context-sensitive attribute that is specific to a respective data provider. The instructions may include instructions to store the first instance in a first provider data partition associated with the first data provider, the second instance in a second provider data partition associated with the second data provider, and the reconciled resource object in a target data partition, receive a context-sensitive query including context information identifying a source originally providing the data associated with the context-sensitive attribute, query at least one data partition among a plurality of data partitions in response to the query, where the plurality of data partitions includes the first provider data partition, the second provider data partition, and the target data partition, and retrieve provider-specific data associated with the context-sensitive attribute that corresponds to the identified source from the at least one data partition based on the context information.

The first and second instances of the resource object and the reconciled resource object may share a common key. The instructions may include instructions to query the target data partition for the reconciled resource object corresponding to the context-sensitive attribute and obtain the common key from the reconciled resource object, query the first provider data partition for the first instance using the common key if the context information specifies the first data provider, and obtain the provider-specific data associated with the context-sensitive attribute from the first instance, and query the second provider data partition for the second instance using the common key if the context information specifies the second data provider and obtain the provider-specific data corresponding to the context-sensitive attribute from the second instance.

The common key may include a reconciliation identifier. The instructions may include merge the data associated with the context-sensitive attribute from both the first instance and the second instance to create reconciled data for the context-sensitive attribute. The reconciled data may include first provider-specific data for the first data provider, and second provider-specific data for the second data provider. The reconciled data may include the first provider-specific data, the second provider-specific data, and default data corresponding to results of a reconciliation operation on the context-sensitive attribute.

The instructions may include instructions to query the target data partition for the reconciled resource object, and obtain the first provider-specific data from the reconciled data if the context information specifies the first data provider, and query the target data partition for the reconciled resource object, and obtain the second provider-specific data from the reconciled data if the context information specifies the second data provider.

The instructions to reconcile a first instance of a resource object from a first data provider and a second instance of the resource object from a second data provider to obtain a reconciled resource object may include instructions to merge the data associated with the context-sensitive attribute from both the first instance and the second instance according to a reconciliation rule to create reconciled data for the context-sensitive attribute. The reconciled data may include one of first provider-specific data for the first data provider and second provider-specific data for the second data provider.

The instructions may include instructions to query the target data partition for the reconciled resource object to obtain a reconciliation identifier corresponding to the reconciled resource object, query the first provider data partition if the context information specifies the first data provider using the reconciliation identifier and obtain the provider-specific data associated with the context-sensitive attribute from the first instance, and query the second provider data partition if the context information specifies the second data provider using the reconciliation identifier and obtain the provider-specific data associated with the context-sensitive attribute from the second instance.

The embodiments may provide a method for storing and retrieving data. The method may include reconciling, by at least one processor, a first instance of a resource object from a first data provider and a second instance of the resource object from a second data provider to obtain a reconciled resource object. Each of the first instance and the second instance may include a context-sensitive attribute and data associated with the context-sensitive attribute that is specific to a respective data provider. The reconciled resource object may include the context-sensitive attribute and reconciled data associated with the context-sensitive attribute. The reconciling may include merging the data associated with the context-sensitive attribute from both the first instance and the second instance to create the reconciled data for the context-sensitive attribute, where the reconciled data includes first provider-specific data for the first data provider, and second provider-specific data for the second data provider.

The method may further include storing, by the at least one processor, the first instance in a first provider data partition associated with the first data provider, the second instance in a second provider data partition associated with the second data provider, and the reconciled resource object in a target data partition, and receiving, by the at least one processor, a context-sensitive query including the context-sensitive attribute and context information identifying a source originally providing the data associated with the context-sensitive attribute. The method may further include querying, by the at least one processor, the target data partition for the reconciled resource object, and obtaining the first provider-specific data from the reconciled data if the context information specifies the first data provider, and querying, by the at least one processor, the target data partition for the reconciled resource object, and obtaining the second provider-specific data from the reconciled data if the context information specifies the second data provider.

The reconciled data may include the first provider-specific data, the second provider-specific data, and default data corresponding to results of a reconciliation operation on the context-sensitive attribute.

BRIEF DESCRIPTION OF THE DRAWINGS

FIG. 2B illustrates example queries to be performed by a context-sensitive query engine of FIG. 1 using at least one of the data sets of FIG. 2A, which is dependent upon on a first storage technique or a second storage technique, according to an embodiment;

DESCRIPTION OF EXAMPLE EMBODIMENTS

Figure 1:
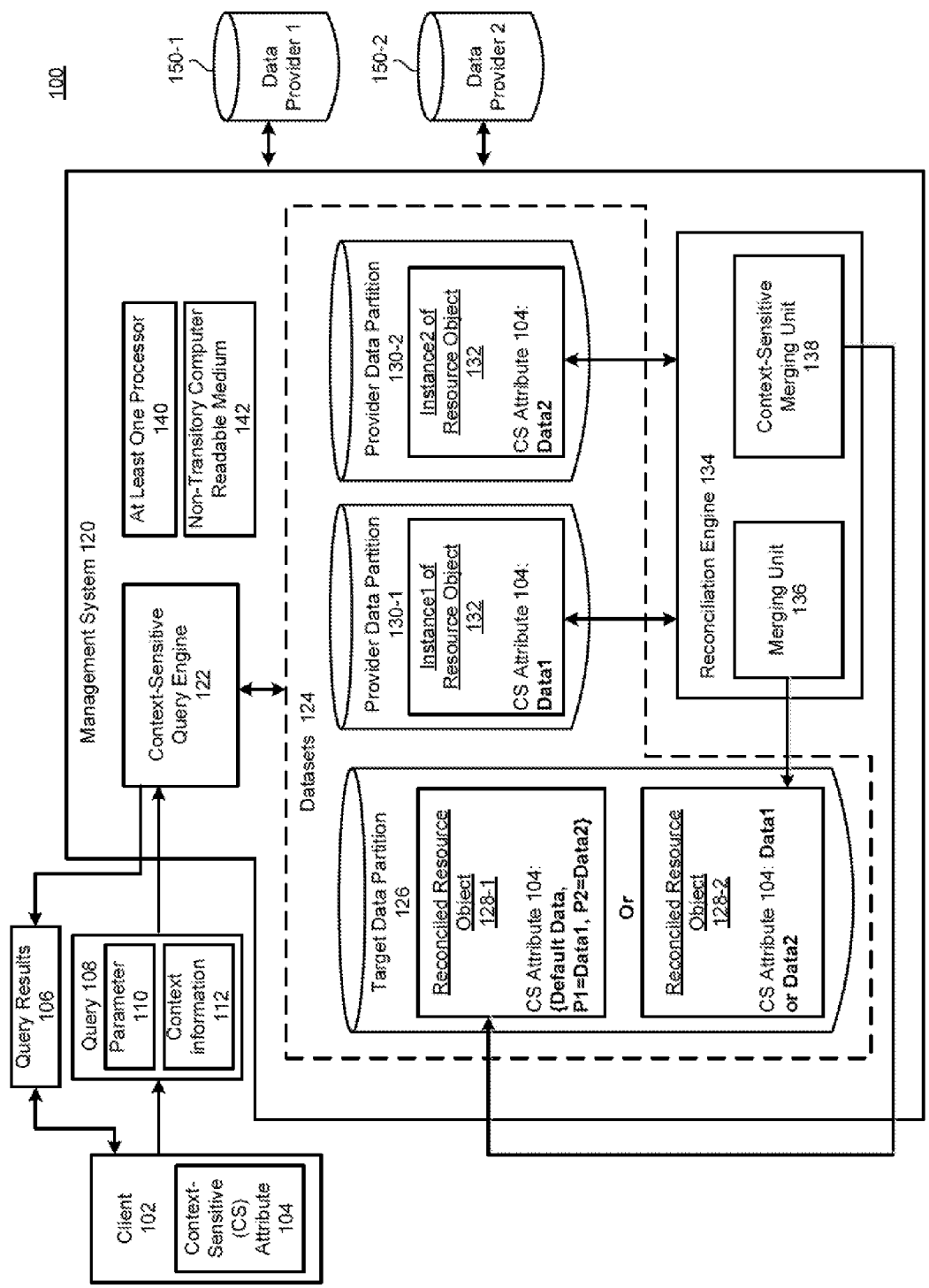
FIG. 1 illustrates a system for storing and retrieving data using a management system according to an embodiment.

The embodiments provide a management system for storing and/or retrieving context-sensitive data. For example, the management system may be populated with resource objects originating from a plurality of different data sources, and instances of the same resource object may be reconciled into a single unified resource object according to reconciliation/merger rules such that the resource objects may be stored in a target data partition without having duplicates. Each resource object to be populated into the management system may include attributes and associated data. Generally, instances of the same resource object may include similar attributes and associated data. However, a specific-provider may define an attribute in a manner different than another provider, which may be considered provider-specific data.

In one example, a first data provider may define a first instance of a resource object (e.g., person A object) as the name, email address, and social security number of person A, and a second data provider may define a second instance of the resource object as the name, email address, and driver's license number of person A. The social security number may be the unique key for the first data provider to identify people and trace them back to the first data provider's system, and the driver's license number may be the unique key for the second data provider to identify people and trace them back to the second data provider's system. Then, the first instance and the second instance may be identified as relating to the same resource object. Because the first instance and the second instance relate to the same resource object, the first instance and the second instance may be reconciled according to reconciliation/merger rules, and the reconciled resource object may be stored in a target data partition (also referred to as a target data set).

However, when the first instance and the second instance of the person A object are reconciled, the reconciled resource object may not necessarily include both the driver's license number and the social security number (e.g., the reconciliation/merger rules may specify that one of the provider-specific data overrides the other provider-specific data). For example, as a result of the reconciliation/merger rules, it is possible that attribute content from a specific data source may not be present in the target data set. As such, when the first provider queries the target database for the resource object using the driver's license number as a query parameter, the query results may be returned as empty, or with the wrong identification number.

However, in order to ensure that the data from the resource objects are properly stored, reconciled, and then retrieved, the management system permits the re-use of one or more existing, common attributes that define an instance of a resource object, which may be identified by the management system as context-sensitive attributes. In particular, one or more of the existing common attributes across multiple instances of the same resource object may be set as a context-sensitive attribute or property. The context-sensitive attribute may indicate that its associated data is dependent upon the source originally providing the data.

As a result, the management system, upon discovery the resource objects in the data providers, may determine that one or more of their attributes is/are context-sensitive attributes. Then, the management system may store the context-sensitive data of the context-sensitive attribute according to a first storage technique, which stores the context-sensitive data (also referred to as provider-specific data) in a unique manner in the target data partition (e.g., data from every provider is present in the target data partition under the corresponding context-sensitive attribute). If the context-sensitive data was stored using the first storage technique, in order to retrieve desired provider-specific data of the context-sensitive attribute, the management system may receive a query containing context information specifying a desired data provider, and then may obtain the appropriate provider-specific data from the target data partition.

Alternatively, the management system may store the context-sensitive data of the context-sensitive attribute according to a second storage technique, which stores the context-sensitive data in a conventional manner in the target data partition (e.g., provider-specific data is populated into the target dataset based on merger priorities). As a result, provider-specific data for only one provider may be present in the target data partition. However, if the context-sensitive data was stored using the second storage technique, the management system may include retrieval logic that is configured to determine where the desired provider-specific data is stored, and then retrieve the desired provider-specific data from the appropriate data partition, which may be one of the provider data partitions.

In this example, the query may contain context information specifying a source originally providing the desired provider-specific data, and the retrieval logic may be configured to determine the appropriate place where such information is stored based on the context information, and then retrieve the appropriate provider-specific data. In one example, provider-specific data of the context-sensitive attribute may be retrieved directly from the provider data partition. These and other features of the embodiments are further described with reference to the figures.

FIG. 1 illustrates a system 100 for storing and retrieving data using a management system according to an embodiment. The system 100 may include a management system 120, a plurality of data providers 150, and a client 102. The system 100 may include other components that are well known to one of ordinary skill in the art.

The management system 120 may include a configuration management system (CMS), a configuration management database (CMDB), and/or any type of management system that monitors and manages resources of the data providers 150. The management system 120 may include at least one processor 140, and a non-transitory computer-readable medium 142. The non-transitory computer-readable medium 142 may include instructions, when executed by the at least one processor 140, cause the at least one processor 140 to implement each component of the management system 120, as well as any the functionalities or operations of the management system 120 as described herein. The management system 120 may include a context-sensitive query engine 122, a plurality of datasets 124, and a reconciliation engine 134, as further explained below. Also, the management system 120 may include other components that are well known to one of ordinary skill in the art.

The client 102 may be any type of application running a server/computer that is capable of communication with the management system 120. The client 102 may be associated with one of the data providers 150. For example, the client 102 may be installed on a first provider system, a second provider system, or any provider system associated with the management system 120. According to some embodiments, the client 102 may define resource objects, initiate discovery processes in order to discover new resource objects within the data providers 150 and/or populate the discovered resource objects in the datasets 124. Further, the client 102 may be configured to initiate reconciliation requests in order to consolidate data within the datasets 124, or initiate queries in order to search the datasets 124 for desired information, as further explained below.

In addition, according to the embodiments, the client 102 may be configured to set one or more attributes of a resource object as a context-sensitive attribute 104, which may then notify the management system 120 that the context-sensitive attribute 104 includes data that may be provider-specific or context-sensitive. For example, the client 102 may re-use of one or more existing, common attributes that define an instance of a resource object, which may be then identified by the management system 120 as the context-sensitive attribute 104. In particular, one or more of the existing common attributes across multiple instances of the same resource object may be set as the context-sensitive attribute 104. The context-sensitive attribute 104 may indicate that its associated data is dependent upon the source originally providing the data such as a first data provider 150-1 or a second data provider 150-2. As a result, the management system 120, upon discovery the resource objects in the data providers 150, may determine that one or more of their attributes is/are context-sensitive attributes 104.

The datasets 124 of the management system 120 may be populated with resource objects 132 from the plurality of data providers 150 using various different discovery processes. As shown in FIG. 1, the plurality of data providers 150 may include the first data provider 150-1 and the second data provider 150-2, as well as any number of data providers 150. For example, although only two data providers 150 are illustrated in FIG. 1, the plurality of data providers 150 may include any number of data providers 150. For instance, typically, an enterprise associated with the management system 120 may include 30-60 different data providers 150 that populate data into the management system 120. Each data provider 150 may represent a different system, organizational unit, organization, or entity that stores and/or creates resource objects 132. The resource objects 132 may include, but are not limited to, computer systems, components of computer systems, data storage systems, switches, routers, memory, software applications, operating systems, and/or business services, for example.

As different discovery processes may encounter the same resource object, it is important to identify such situations, and then merge and/or consolidate the information provided by the different processes for each resource object 132 to avoid creating duplicate resource objects. For instance, reconciling resource objects 132 in multiple datasets 124 may allow different data providers 150 to populate their own provider data partitions 130, but still allow the management system 120 to have the ability to merge the instances within the various data partitions into a single, unified resource data partition (e.g., the target data partition 126) without duplicates.

The client 102 may define and execute reconciliation request that can be triggered to run at various times, e.g., each time a new resource object 132 is created in a provider data partition 130, at specified intervals based on scheduling criteria, or on demand. The resource objects 132 may be created by discovery processes, or created manually. For example, if a new computer system has been installed and the user does not want to wait until the running of the next scheduled discovery process to include the resource object 132 of the newly installed computer system in the management system 120, the user may create it manually via the client 102. As such, the client 102 may include a user interface where reconciliation properties are defined and the parameters of the reconciliation request are specified. The parameters of the reconciliation request may serve in some manner to limit the number of types of resource objects that are considered by the reconciliation process.

The reconciliation engine 134 may discover and receive the resource objects 132 in the data providers 150-1, and populate the datasets 124 with this information. The datasets 124 may include a target data partition 126, and a plurality of provider data partitions 130 including a first provider data partition 130-1 and a second provider data partition 130-1. However, the datasets 124 may include any type of dataset 124 known to one of ordinary skill in the art. For example, the datasets 124 may include multiple target data partitions 126, or other types of data partitions used to store the discovered resource objects 132. The first provider data partition 130-1 may be associated with the first data provider 150-1, and the second provider data partition 130-2 may be associated with the second data provider 150-2. However, the number of provider data partitions 130 may be dependent upon the number of data providers 150. As such, the provider data partitions 130 may include any number of provider data partitions 130. Each provider data partition 130 may store discovered resource objects 132 corresponding to a respective data provider 150, which may represent an entity's overall data or a subset of data such as data from specific departments or regions.

The target data partition 126 may represent any type of target data partition such as a production data set or pre-production data set, etc. As further explained below, the target data partition 126 becomes populated with reconciled resource objects such as reconciled resource object 128-1 or reconciled resource object 128-2.

In general, the reconciliation engine 134 may perform any or all of the following reconciliation activities: identifying resource objects 132 that are the same entity in two or more datasets 124; merging datasets 124; comparing resource objects 132 in two or more datasets 124; copying the resource objects 132 from one dataset 124 to another; deleting instances from one or more datasets 124; purging instances that are marked as deleted from one or more datasets 124; and renaming datasets 124. However, one of the goals of the reconciliation engine 134 is to end up with a dataset (e.g., the target data partition 126) that is free from duplicated resource objects 132. In this respect, the reconciliation engine 134 may be configured to reconcile different instances of the same resource object 132 to obtain a reconciled resource object 128.

However, as indicated above, in order to ensure that the provider-specific data for the same resource object 132 is properly stored and can be retrieved, one or more of the existing common attributes across multiple instances of the same resource object 132 may be set as the context-sensitive attribute 104. For example, each resource object 132 may include a plurality of attributes and corresponding data. Of the plurality of attributes, at least some of the attributes may be common attributes across all instances of the same resource object 132. Continuing with the above person object example, the person ID may be an existing common attribute across all instances of the person A object. The person ID attribute associated with the first data provider 150-1 may include first provider-specific data such as the driver's license number, and the person ID attribute associated with the second data provider 150-2 may include second provider-specific data such as the social security number. However, the person ID attribute is common to all instances of the person A object, and maybe set as the context-sensitive attribute 104 for storing and/or retrieving the provider-specific data, as further explained below.

In one example, referring to FIG. 1, the reconciliation engine 134 may receive a first instance of the resource object 132 from the first data provider 150-1, and a second instance of the resource object 132 from the second data provider 150-2. The first instance and the second instance may relate to the same resource object 132. As shown in FIG. 1, the first instance of the resource object 132 may include the context-sensitive attribute 104 with first provider-specific data (Data1) associated with the first data provider 150-1, and the second instance of the resource object 132 may include the context-sensitive attribute 104 with second provider-specific (Data2) associated with the second data provider 150-2.

The reconciliation engine 134 may store the first instance of the resource object 132 and the second instance of the resource object 132 into the provider data partitions 130 and the target data partition according to the first storage technique or the second storage technique. For example, the reconciliation engine 134, upon discovery the first instance of the resource object 132 in the first data provider 150-1 and/or the second instance of the resource object 132 in the second data provider 150-2, may determine that one or more of their attributes includes the context-sensitive attribute 104. Then, the reconciliation engine 134 may store the context-sensitive data (Data1, Data2) of the context-sensitive attribute 104 according to the first storage technique, which stores the context-sensitive data (Data1, Data2) in a unique manner in the target data partition 126 (e.g., reconciled resource object 128-1). Alternatively, the reconciliation engine 134 may store the context-sensitive data (Data1, Data2) of the context-sensitive attribute 104 according to the second storage technique, which stores the context-sensitive data (Data1, Data2) in a conventional manner in the target data partition (e.g., reconciled resource object 128-2).

With respect to the second storage technique, the reconciliation engine 134 may include a merging unit 136 that is configured to reconcile the first instance of the resource object 132 and the second instance of the resource object 132 according to one or more reconciliation/merger rules to obtain the reconciled resource object 128-2. For example, the attributes and their associated data may be merged to produce a single, uniformed reconciled resource object. As a result of such reconciliation/merger rules, it is possible that attribute content (both Data1 and Data2) from the first data provider 150-1 and the second data provider 150-2 may not be presented in the target data partition 126. As such, the context-sensitive attribute 104 of the first and second instances may include reconciled data such as the first provider-specific data (Data1) associated with the first data provider 150-1 or the second provider-specific data (Data2) associated with the second data provider 150-2. In particular, the reconciliation rules may specify that data associated with one type of provider is provided as the reconciled data for the context-sensitive attribute 104. Accordingly, the reconciled data for the context-sensitive attribute 104 may include Data1 or Data2, but not necessarily both Data1 and Data2.

With respect to the first storage technique, the reconciliation engine 134 may include a context-sensitive merging unit 138 that may be configured to merge the provider-specific data (Data1, Data2) associated with the context-sensitive attribute 104 from both the first and second instances to create the reconciled resource object 128-1. The reconciled resource data for the context-sensitive attribute 104 may include the first provider-specific data (Data1) for the first data provider 150-1 and the second provider-specific data (Data2) for the second data provider 150-2. In particular, the context-sensitive attribute 104 may include source identification information (P1, P2)) indicating the source originally providing the provider-specific data, as well as the actual provider-specific data (Data1, Data2). As such, the reconciled resource data for the context-sensitive attribute 104 may identify the first data provider 150-1 as P1 and its associated provider-specific data as Data1, and may identify the second data provider 150-2 as P2 and its associated provider-specific data as Data2.

Further, the reconciled resource data for the context-sensitive attribute 104 of the reconciled resource object 128-1 may include default data, which may include one of Data1 and Data2 depending on the reconciliation/merger rules. For instance, the reconciliation rules may specify that Data1 overrides Data2, and therefore, the context-sensitive attribute 104 may include Data1 as the default data for the context-sensitive attribute 104. For example, the default data may correspond to the results of the reconciliation operation on the context-sensitive attribute 104. Therefore, as shown with respect to the reconciled resource object 128-1, the context-sensitive attribute 104 may include {Default Data, P1=Data1, and P2=Data2).

The reconciliation engine 134 may store the first instance of the resource object 132 in the first provider data partition 130-1 associated with the first data provider 150-1, the second instance of the resource object 132 in the second provider data partition 130-2 associated with the second data provider 150-1, and the reconciled resource object 128 (e.g., either the reconciled resource object 128-1 created by the context-sensitive merging unit 138 or the reconciled resource object 128-2 created by the merging unit 136) in the target data partition 126. Further, as part of the reconciliation process, the reconciliation engine 134 may assign a reconciliation identifier to the first instance of the resource object 132, the second instance of the resource object 132, and the reconciled resource object 128. The reconciliation identifier may be the same value, which is assigned to each of the instances of the same resource object.

Also, it is noted that besides a shared reconciliation identifier, the first and second instances of the resource object 132 and the reconciled resource object 128 may share another common key. The common key may be any type of parameter that is shared between resource objects 132, and may be dependent up on the identification rules. For example, in order to reconcile two or more resource objects 132, they are first identified as the same resource object coming from different data providers 150. In the person object example, the resource objects 132 may be identified as the same if they have the same name or same email address. As such, in this example, the common key may be the name or the email address. However, generally, the common key between instances of the same object may encompass any type of attribute or parameter.

In order to retrieve the stored data in the datasets 124, the context-sensitive query engine 122 may be configured to receive a query 108 from the client 102. For instance, an operator of the client 102 may wish to retrieve context-sensitive data (Data1 or Data2) from the management system 120 by constructing the query 108. According to the embodiments, the query 108 may include one or more query parameters 110 and context information 112. Within the situation of searching for context-sensitive data, the query parameters 110 may include information that identifies the context-sensitive attribute 104. In the above example of the person object, the query parameter 110 may specify the person ID attribute. The context information 112 may identify a source originally providing provider-specific data. For example, the context information 112 may specify one of the plurality of data providers 150 such as the first data provider 150-1 or the second data provider 150-2. According to one embodiment, the context information 112 may specify identification information that either identifies one or more of the data provider 150 or one or more of the provider data partition 130. For example, if the operator wishes to retrieve Data1, the query 108 may include the context-sensitive attribute 104 (e.g., Person ID attribute) as the query parameter 110, and Prov1DS (which identifies the first provider data partition 130-1) as the context information 112.

In one example, continuing with the above person object example, the query 108 may specify the person ID attribute for a particular person as the query parameter 110 and identify the first data provider 150-1 as the context information 112. Accordingly, the context-sensitive query engine 122 may query at least one data partition among a plurality of data partitions, where the plurality of data partitions includes the first provider data partition 130-1, the second provider data partition 130-2, and the target data partition 126.

Then, the context-sensitive query engine 122 may retrieve the provider-specific data (Data1 or Data2) associated with the context-sensitive attribute 104 that corresponds to the identified source from the at least one data partition based on the context-sensitive attribute 104 and the context information 112. For instance, in response to the query 108, the context-sensitive query engine 122 may be able to determine where the requested data is stored, and then retrieve the provider-specific data associated with the context-sensitive attribute 104, using the context information 112. In further detail, if the context information 112 specifies the first data provider 150-1, the context-sensitive query engine 122 may query the first provider data partition 130-1 or the target data partition 126 for the Data1 of the context-sensitive attribute 104. Similarly, if the context information 112 specifies the second data provider 150-2, the context-sensitive query engine 122 may query the second provider data partition 130-1 or the target data partition 126 for the Data2 of the context-sensitive attribute 104. Then, the context-sensitive query engine 122 may be configured to return query results 106 (which include the retrieved provider-specific data) to the client 102 for storage and/or display.

In one implementation, if the reconciliation engine 134 reconciles the first and second instance of the resource object 132 as the reconciled resource object 128-2 (e.g., according to the second storage technique), the context-sensitive query engine 122 may query the target data partition 126 for the reconciled resource object 128-2 according to the context-sensitive attribute 104, and obtain a common key from the reconciled resource object 128-2. In one example, the common key may be the reconciliation identifier.

Then, the context-sensitive query engine 122 may query the first provider data partition 130-1 for the first instance of the resource object 132 using the common key if the context information 112 specifies the first data provider 150-1, and obtain the provider-specific data (Data1) associated with the context-sensitive attribute 104 from the first instance of the resource object 132. For example, the context-sensitive query engine 122 may be configured to determine which of the datasets 124 to search based on the context information 112. For instance, if the context information specifies the first data provider 150-1, then the context-sensitive query engine 122 is directed to search the first provider data partition 130-1. Then, using the common key, the context-sensitive query engine 122 may locate the resource object 132 having the same value as the common key within the first provider data partition 130-1. Within the located resource object 132, the context-sensitive query engine 122 may obtain the provider-specific data associated with the context-sensitive attribute 104, as indicated in the query parameters 110 of the query 108. The context-sensitive query engine 122 may be configured to provide the provider-specific data (Data1) associated with the context-sensitive attribute 104 to the client 102 within the query results 106.

Also, the context-sensitive query engine 122 may be configured to query the second provider data partition 130-2 for the second instance of the resource object 132 using the common key if the context information 112 specifies the second data provider 150-2, and obtain the provider-specific data (Data2) corresponding to the context-sensitive attribute 104 from the second instance of the resource object 132. For example, the context-sensitive query engine 122 may be configured to determine which of the datasets 124 to search based on the context information 112. For instance, if the context information specifies the second data provider 150-2, then the context-sensitive query engine 122 is directed to search the second provider data partition 130-2. Then, using the common key, the context-sensitive query engine 122 locates the resource object 132 having the same value as the common key within the second provider data partition 130-2. Within the located resource object 132, the context-sensitive query engine 122 may obtain the provider-specific data (Data2) associated with the context-sensitive 104, as indicated in the query parameters 110 of the query 108. The context-sensitive query engine 122 may be configured to provide the provider-specific data associated with the context-sensitive attribute 104 to the client 102 within the query results 106.

In another implementation, if the reconciliation engine 134 reconciles the first and second instance of the resource object 132 as the reconciled resource object 128-1 (e.g., according to the first storage technique), the context-sensitive query engine 122 may query the target data partition 126 for the reconciled resource object 128-2 according to the context-sensitive attribute 104, and obtain the desired provider-specific data (Data1, Data2) as identified by the context information 112 from the reconciled resource object 128-2. For example, as indicated above, according to the first storage technique, context-sensitive data for the context-sensitive attribute 104 from every data provider 150 is present in the target data partition 126 under the context-sensitive attribute 104, as shown in the reconciled resource object 128-1. Then, the context-sensitive query engine 122 may be configured to provide the provider-specific data associated with the context-sensitive attribute 104 to the client 102 within the query results 106.

In more detail, if the context information 112 specifies the first data provider 150-1, the context-sensitive query engine 122 may be configured to query the target data partition 126 for the reconciled resource object 128-1 as specified in the query parameter 110, and obtain the first provider-specific data (Data1) from the reconciled data (Default Data, P1=Data1, P2=Data2) based on the context information 112. If the context information 112 specifies the second data provider 150-2, the context-sensitive query engine 122 may be configured to query the target data partition 126 for the reconciled resource object 128-1 as specified in the query parameter 110, and obtain the second provider-specific data (Data2) from the reconciled data (Default Data, P1=Data1, P2=Data2) based on the context information 112.

Figure 2A:
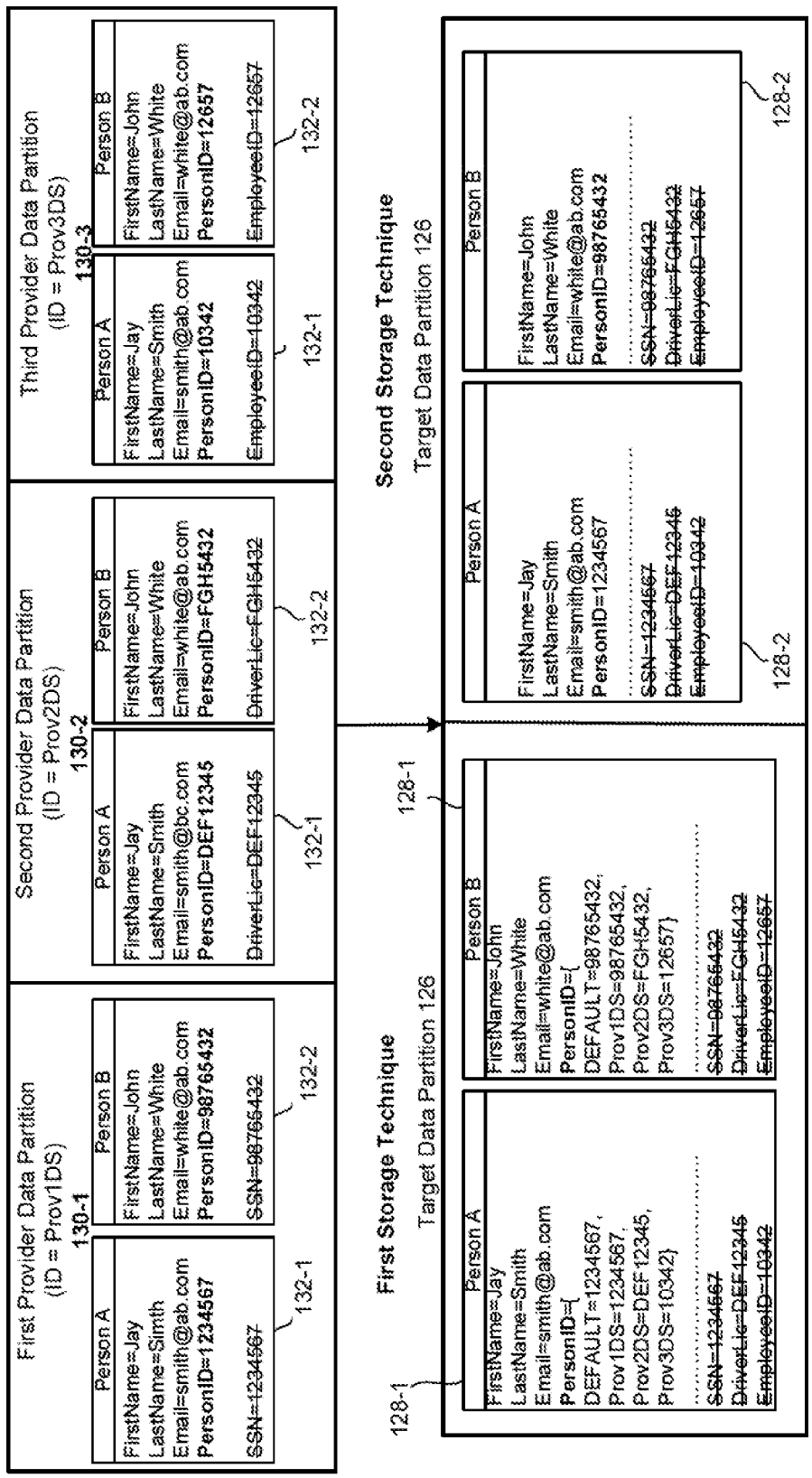
FIG. 2A illustrates the storage of data within provider data partitions and a target data partition of the system of FIG. 1 that reduce the number of attributes of the person/class objects according to an embodiment.

FIG. 2A illustrates the storage of data within the provider data partitions 130 and the target data partition 126 according to the embodiments. For example, FIG. 2A illustrates how provider-specific data for the context-sensitive attribute 104 is stored in the provider data partitions 130 and the target data partitions 126 according to the first storage technique and the second storage technique, which may reduce the number of attributes. The example resource objects 132, 128 of FIG. 2A relate to person/class objects. However, it is noted that the concepts explained with reference to FIG. 2A can be extended to any types of resource objects known to one of ordinary skill in the art.

The first provider data partition 130-1 includes a first instance of person A object 132-1, and a first instance of person B object 132-2. Also, the first provider data partition 130-1 may be identified as a data partition belonging to the first data provider 150-1 by the provider/partition identification information, which is Prov1DS. The second provider data partition 130-2 includes a second instance of the person A object 132-1, and a second instance of the person B object 132-2. The second provider data partition 130-2 may be identified as a data partition belonging to the second data provider 150-2 by the provider/partition identification information, which is Prov2DS. The third provider data partition 130-3 includes a third instance of the person A object 132-1 and a third instance of the person B object 132-2. As shown in FIG. 2A, each resource object 132 includes a plurality of attributes such as the first name, last name, email, and a person ID, which are common to each of the resource objects 132. However, in this case, the person ID attribute is set as the context-sensitive attribute 104.

Each of the data providers 150-1 to 150-3 uses a different way of identifying people. The first data provider 150-1 associated with the first provider data partition 130-1 uses the social security number of person A/B, the second data provider 150-2 associated with the second provider data partition 130-2 uses the driver's license number of person A/B, and the third data provider 150-3 associated with the third provider data partition 130-3 uses the employee ID number of person A/B.

Conventionally, for context-sensitive data, in order to ensure that that each provider-specific data is stored within the target data partition 126, a user would have to manually add an additional attribute field, which is shown at the bottom of each resource object 132 (e.g., SSN=1234567, DriverLic=DEF12345, EmployeeID=10342, etc.). For instance, conventionally, a user of the first provider 150-1 would have create an additional attribute within the person A/B object such as the Social Security Attribute, and then would supply the social security number of that person. Similarly, a user of the second data provider 150-2 would have to create an additional attribute with the person A/B object such as the driver's license attribute, and then would supply the driver's license number of that person. A user of the third data provider 150-3 would have to create an additional attribute with the person A/B object such as the employee ID attribute, and then would supply the employee ID number of that person. These manually-added attribute fields are indicated as "crossed-out" because they are no longer required in the system 100.

For example, according to the embodiments, because these "keys" (e.g., social security number, driver's license number, employee ID) are dependent upon a specific provider, one of the common existing attributes may be used for such information, and therefore set as the context-sensitive attribute 104. In the example of FIG. 2A, the person ID attribute is set as the context-sensitive attribute 104, where each data provider 150 may populate this attribute with its provider-specific data. For example, the first data provider 150-1 may supply the social security numbers for the person A object 132-1 and the person B object 132-2 within the person ID attribute, the second data provider 150-2 may supply the driver's license numbers for the person A object 132-1 and the person B object 132-2 within the person ID attribute, and the third data provider 150-3 may supply the employee ID numbers for the person A object 132-1 and the person B object 132-2 within the person ID attribute. As such, with the system 100, it is possible to re-use the same attribute(s) rather than creating new attributes for each data provider 150. Further, this structure permits the query 108 to be more dynamic, as further explained with reference to FIG. 2B.

As shown in FIG. 2A and explained above with respect to FIG. 1, the resource objects 132 may be reconciled and stored in the target data partition 126 according to the first storage technique or the second storage technique. In the first storage technique, context-sensitive data from every data provider 150 is present in the target data partition 126. In the second storage technique, context-sensitive data becomes populated into the target data partition 126 based on the merger priorities, which may indicate that provider-specific data for one provider overrides the provider-specific data for the other data providers. In contrast, conventionally, the manually-added attributes and their corresponding data will be duplicated in the target data partition 126, as shown at the bottom of the reconciled resource objects 128 (e.g., SSN=1234567, DriverLic=DEF12345, EmployeeID=10342, etc.). For example, conventionally, data from every data provider 150 is present in the target data partition 126 even if it is only relevant for a specific data provider. It can be appreciated that if each data provider 150 needed several "key" attributes for every populated class, and there exists 30 or more data providers 150, the number of information being processed by the reconciliation engine 134 greatly increases. However, this information is illustrated as "crossed-out" because the duplication of these attributes and corresponding data in the manner shown in the target data partition 126 is no longer required.

In more detail, with respect to the first storage technique, the context-sensitive merging unit 138 may merge the first instance of person A object 132-1 associated with the first data provider 150-1, the second instance of person A object 132-1 associated with the second data provider 150-2, and the third instance of person A object 132-1 associated with the third data provider 150-3, because each of these instances relate to the same resource object—the person A object.

As a result, the context-sensitive merging unit 138 may create the reconciled resource object 128-1 associated with person A. For example, the reconciled resource object 128-1 associated with person A includes the first name, the last name, the email, and person ID of person A. However, because the person ID has been set as the context-sensitive attribute 104, provider-specific data from every data provider 150 is present in the target data partition 126 under the context-sensitive attribute 104. As such, the reconciled data associated with the context-sensitive attribute 104 includes default data, and the provider-specific data for each of the data providers 150 along with information that links the provider-specific data to its corresponding provider data partition, as further explained below.

For example, referring to the reconciled resource object 128-1 of the person A, the person ID attribute includes Prov1DS=1234567, Prov2DS=DEF12345, and Prov3DS=10342. The term Prov1DS identifies the first provider data partition 130-1, and the value 1234567 corresponds to the social security number of person A, which is the key parameter used for searching within the first data provider 150-1. The term Prov2DS identifies the second provider data partition 130-2, and the value DEF12345 corresponds to the driver's license number of person A, which is the key parameter used for searching within the second data provider 150-2. The term Prov3DS identifies the third provider data partition 130-3, and the value 10342 corresponds to the employee's ID, which is the key parameter used for searching within the third data provider 150-3.

The default data may correspond to the results of the reconciliation process on the provider-specific data for the context-sensitive attribute 104. For example, the default data provides the provider-specific data associated with the context-sensitive attribute 104 that corresponds to the existing reconciliation priority rules associated with the reconciliation engine 134. For example, the reconciliation rules may specify that one of the provider's data overrides over other data providers. In this case, the reconciliation rules specify that the provider-specific data associated with the first data provider 150-1 overrides the other data providers. As such, the default data of person A specifies the social security number of person A.

With respect to the reconciled resource object 128-1 of person B, the context-sensitive merging unit 138 may merge the first instance of person B object 132-2 associated with the first data provider 150-1, the second instance of person B object 132-2 associated with the second data provider 150-2, and the third instance of person B object 132-2 associated with the third data provider 150-3, because each of these instances relate to the same resource object—the person B object. As a result, the context-sensitive merging unit 138 may create the reconciled resource object 128-1 associated with person B. For example, the reconciled resource object 128-1 associated with person B includes the first name, the last name, the email, and the person ID of person B. However, because the person ID has been set as the context-sensitive attribute 104, provider-specific data from every data provider 150 is present in the target data partition 126 under the context-sensitive attribute 104. As such, the reconciled data associated with the context-sensitive attribute 104 includes default data, and the provider-specific data for each of the data providers 150 along with information that links the provider-specific data to its corresponding provider data partition.

For example, referring to the reconciled resource object 128-1 for the person B, the person ID attribute includes Prov1DS=98765432, Prov2DS=FGH5432, and Prov3DS=12657. The term Prov1DS identifies the first provider data partition 130-1, and the value 98765432 corresponds to the social security number of person B, which is the key parameter used to link back to the first provider's proprietary application or data repository. The term Prov2DS identifies the second provider data partition 130-2, and the value FGH5432 corresponds to the driver's license number of person B, which is the key parameter used to link back to the second provider's proprietary application or data repository. The term Prov3DS identifies the third provider data partition 130-3, and the value 12657 corresponds to the employee's ID number, which is the key parameter used to link back to the third provider's proprietary application or data repository.

The default data may correspond to the results of the reconciliation process on the provider-specific data for the context-sensitive attribute 104. For example, the default data provides the provider-specific data associated with the context-sensitive attribute 104 that corresponds to the existing reconciliation priority rules associated with the reconciliation engine 134. For example, the reconciliation rules may specify that one of the provider's data overrides over other data providers. In this case, the reconciliation rules specify that the provider-specific data associated with the first data provider 150-1 overrides the other data providers. As such, the default data of person B specifies the social security number of person B.

According to the second storage technique, the merging unit 136 may be configured to merge the context-sensitive data associated with the context-sensitive attribute 104 from the instances of the same resource object 132 according to one or more reconciliation/merger rules, and store the reconciled resource object as resource object 128-2. For example, the reconciliation engine 134 may merge instances of the same resource object 132 according to any type of merging techniques, and store the reconciled resource object 128-2 in the target data partition 126. In the example of FIG. 2A, even though the person ID attribute is set as the context-sensitive attribute 104, the merging unit 136 may merge the context-sensitive data associated with the person ID attribute according to existing merging techniques (e.g., does not account for the fact that the person ID attribute is context-sensitive).

In particular, as a result of such merger rules, it is possible that one or more provider-specific data may not be presented in the target data partition 126. In particular, the merger rules may specify that the first provider overrides other providers, and therefore, populates the person ID attribute with the social security number of person A for the reconciled resource object 128-2 associated with person A, and the social security number of person B for the reconciled resource object 128-2 associated with person B. However, it is noted that any one of the provider-specific data associated with the person ID may be populated into the reconciled resource object 128-2, which depends on the type of reconciliation rules.

However, regardless of how the data is stored in the target data partition 126, the context-sensitive query engine 122 may be configured to retrieve the appropriate provider-specific data from the datasets 124 based on the query 108. For instance, based on the query 108, the context-sensitive query engine 122 may determine where the desired information is stored, and how to sequentially retrieve it.

If the context-sensitive data was stored using the first storage technique, in order to retrieve desired provider-specific data of the context-sensitive attribute 104, the context-sensitive query engine 122 may receive the query 108 containing the context information 112 specifying a desired data provider, and then may obtain the appropriate provider-specific data from the target data partition 126.

If the context-sensitive data was stored using the second storage technique, in response to the query 108, the context-sensitive query engine 122 determine where the desired provider-specific data is stored, and then retrieve the desired provider-specific data from the appropriate data partition, which may be one of the provider data partitions 130, the target data partition 126, or some other data partition. For example, the query 108 may contain the context information 112 specifying a source originally providing the desired provider-specific data, and the context-sensitive query engine 122 may be configured to determine the appropriate place where such information is stored based on the context information 112, and then retrieve the appropriate provider-specific data. In one example, provider-specific data of the context-sensitive attribute 104 may be retrieved directly from the provider data partition 130.

FIG. 2B illustrates example queries 108 to be performed by the context-sensitive query engine 122 using at least one of the datasets 124 of FIG. 2A, which is dependent upon the first storage technique or the second storage technique, according to an embodiment. For example, each query 108 of FIG. 2B relates to obtaining provider-specific data (e.g., the social security number, driver's license number, or the employee ID number) associated with the context-sensitive attribute 104 (e.g., the person ID attribute) from the datasets 124 of FIG. 2A. The example queries 108 include a first query 108-1, a second query 108-2, a third query 108-3, and a fourth query 108-4, as further explained below.

The first query 108-1 may include the person ID as the query parameter 110, and Prov1DS as the context information 112. In this example, a user may want to obtain the provider-specific data associated with the person ID attribute corresponding to the first data provider 150-1. As such, the user may construct the first query 108-1 to obtain such information. In this example, the context-sensitive query engine 122 may receive the first query 108-1, and in response, may query at least one data partition of the datasets 124. Then, the context-sensitive query engine 122 may retrieve the provider-specific data associated with the context-sensitive attribute 104 that corresponds to the identified source based on the context-sensitive attribute 104 and the context information 112.

In one example, if the provider-specific data was stored according to the first storage technique, the context-sensitive query engine 122 may receive the first query 108-1, and query the target data partition 126 for the reconciled resource object 128-1 for information as specified by the query parameter 110, which identifies the person ID attribute (e.g., the context-sensitive attribute 104). Then, the context-sensitive query engine 122 may obtain the provider-specific data corresponding to the first data provider 150-1 (e.g., the social security number of person AB) because the context information 112 specifies the first provider data partition 130-1 (e.g., Prov1DS). In other words, the context-sensitive query engine 122 may locate the appropriate reconciled resource object 128-1, and then obtain the appropriate provider specific data as specified by the context information 112.

In another example, if the provider-specific data was stored according to second storage technique, the context-sensitive query engine 122 may receive the first query 108-1, and query the target data partition 126 for the reconciled resource object 128-2 corresponding to the context-sensitive attribute 104 (e.g., person ID attribute). For example, the context-sensitive query engine 122 may locate the appropriate reconciled resource object 128-2, and then obtain the common key associated with the reconciled resource object 128-2 from the target data partition 126. Then, the context-sensitive query engine 122 may be directed to the appropriate dataset 124 using the context information 112. For instance, in this case, because the context information 112 specifies the first provider data partition 130-1, the context-sensitive query engine 122 may query the first provider data partition 130-1 for the first instance of the resource object 132 using the common key. In particular, the context-sensitive query engine 122 may obtain the resource object 132 from the first provider data partition 130-1 that has the same common key as the common key that was obtained from reconciled resource 128-2 of the target data partition 126. In this manner, each provider-specific data is linked back to the appropriate data provider 150, thereby allowing efficient retrieval of such information.

Similar to the first query 108-1, the second query 108-2 relates to obtaining provider-specific data corresponding to the person ID attribute. However, the second query 108-2 requests information regarding the second data provider 150-2 corresponding to the person ID attribute. Further, the third query 108-3 requests information regarding the third data provider 150-2 corresponding to the person ID attribute. Because the second query 108-2 and the third query 108-2 operate in a similar as explained with reference to the first query 108-1, the details of the data retrieval for these queries are omitted for the sake of brevity. Also, the fourth query 108-4 operates in a manner similar to the other queries 108. However, the fourth query 108-4 uses a condition for the provider. In the example of the fourth query 108-4, if the day is Sunday, the context-sensitive query engine 122 obtains data from the second data provider 150-2. Otherwise, the context-sensitive query engine 122 uses the default data based on the reconciliation rules. However, the described fourth query 108-4 is merely a simple conditional query, where the embodiments may encompass more complicated queries including several conditional statements based on the content of the attributes set by different providers in different datasets.

Figure 3A:
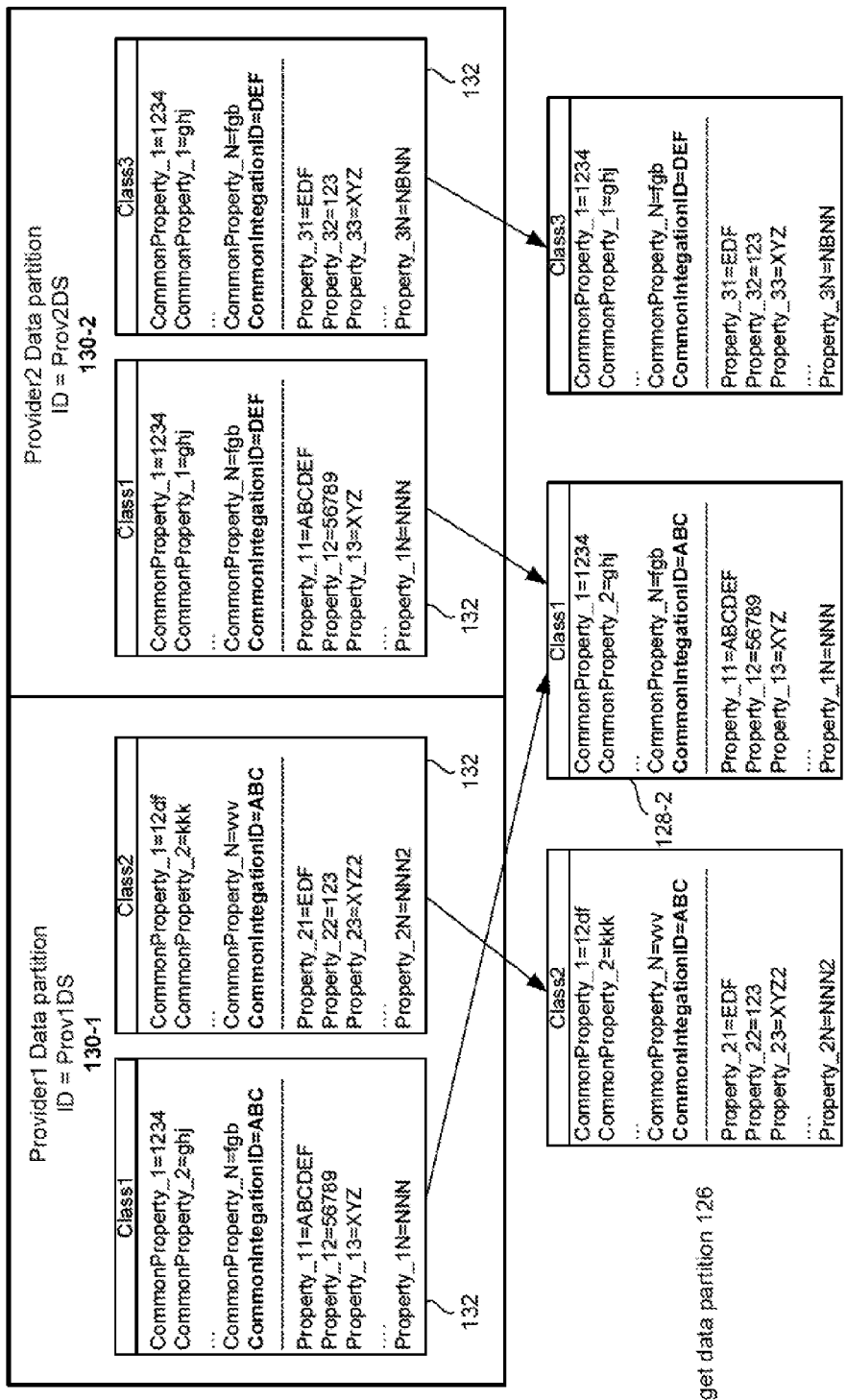
FIG. 3A illustrates the storage of data within the provider data partitions and the target data partition of the system of FIG. 1 using the second storage technique according to an embodiment.

FIG. 3A illustrates the storage of data within the provider data partitions 130 and the target data partition 126 of the system of FIG. 1 using the second storage technique according to another embodiment. The resource objects 132 and the reconciled resource objects 128 of FIG. 3A relate to class objects having a common integration ID attribute. However, it is noted that FIG. 3A is merely an example, where the embodiments encompass any type of resource objects known to one of ordinary skill in the art. In this example, the instances of resource objects 132 associated with Class 1 are reconciled, thereby creating the reconciled resource object 128-2 according to the second storage technique (e.g., provider-specific data is populated into the target data partition 126 based on the reconciliation priorities). In this example, the context-sensitive 104 is the common integration ID, where each data provider 150 uses a different value for the common integration ID.

In this case, the first data provider 150-1 uses ABC as the common integration ID, and the second data provider 150-1 uses DEF as the common integration ID. The merging unit 136 of the reconciliation engine 134 may merge the first instance of the Class 1 object 132 (e.g., associated with the first data provider 150-1), and the second instance of the Class 1 object 132 (e.g., associated with the second data provider 150-2), to create the reconciled resource object 128-2, which contains the common integration ID attribute, but includes only the provider-specific data corresponding to the first data provider 150-1, e.g., the value ABC. In this case, the value ABC associated with the first data provider 150-1 is provided for the common integration ID attribute.

Figure 3B:
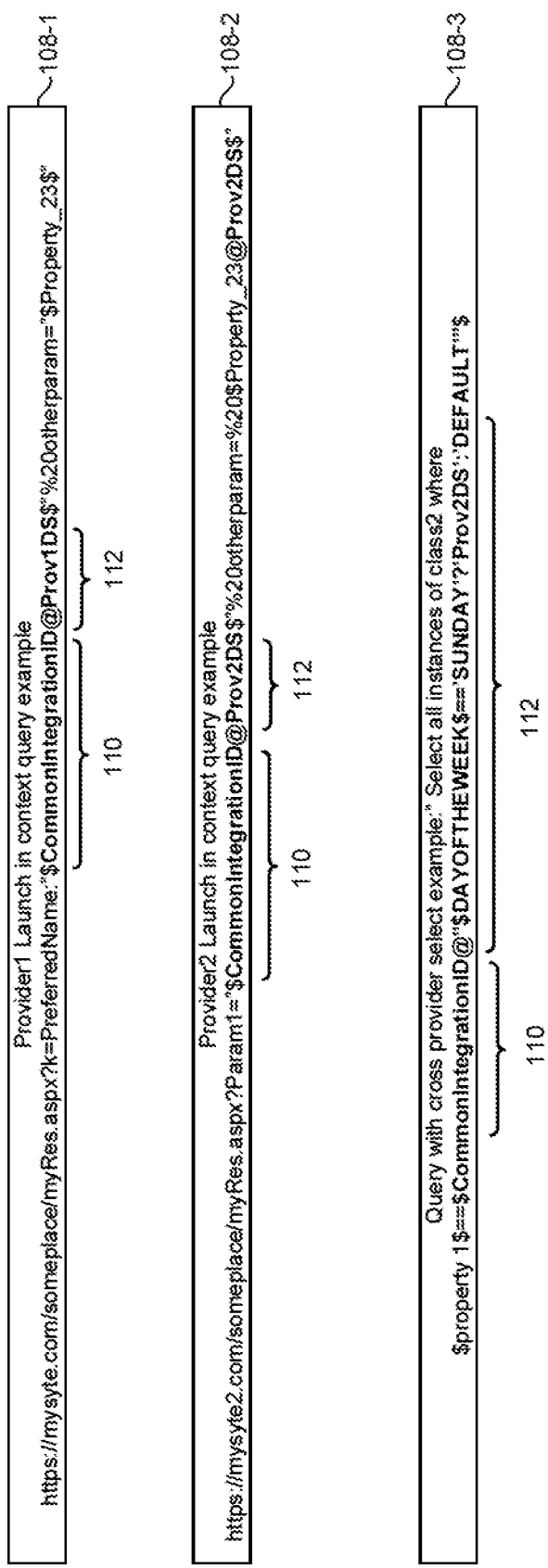
FIG. 3B illustrates example queries to be performed by the context-sensitive query engine of FIG. 1 using the data sets of FIG. 3A according to an embodiment.

FIG. 3B illustrates example queries 108 to be performed by the context-sensitive query engine 122 using the datasets of FIG. 3A according to an embodiment. Similar to second storage technique of FIG. 2B, the context-sensitive query engine 122 may receive any of the queries 108 (e.g., query 108-1, query 108-2, query 108-3), and then retrieve the appropriate provider-specific data using the datasets 124.

For example, the context-sensitive query engine 122 may receive the first query 108-1, and query the target data partition 126 for the reconciled resource object 128-2 corresponding to the context-sensitive attribute 104 (e.g., the common integration ID attribute). The context-sensitive query engine 122 may locate the appropriate reconciled resource object 128-2, and then obtain the common key associated with the reconciled resource object 128-2 from the target data partition 126. Then, the context-sensitive query engine 122 may be directed to the appropriate dataset 124 using the context information 112. For instance, in this case, because the context information 112 specifies the first provider data partition 130-1, the context-sensitive query engine 122 may query the first provider data partition 130-1 for the first instance of the class 1 object 132 using the common key. The context-sensitive query engine 122 may obtain the resource object 132 from the first provider data partition 130-1 that has the same common key as the common key that was obtained from reconciled resource 128-2 of the target data partition 126. In this manner, each provider-specific data is linked back to the appropriate data provider 150, thereby allowing efficient retrieval of such information.

Similar to the first query 108-1, the second query 108-2 relates to obtaining provider-specific data corresponding to the common integration ID attribute associated with the second data provider 150-2. Because of the data retrieval operations of the second query 108-2 is similar to the first query 108-1 explained above, the details of the second query 108-2 are omitted for the sake of brevity. Also, the third query 108-3 operates in a manner similar to the other queries 108. However, the third query 108-3 uses a condition for the provider. In the example of the third query 108-3, if the day is Sunday, the context-sensitive query engine 122 obtains data from the second data provider 150-2. Otherwise, the context-sensitive query engine 122 uses the default data based on the reconciliation rules. However, the described third query 108-3 is merely a simple conditional query, where the embodiments may encompass more complicated queries including several conditional statements based on the content of the attributes set by different providers in different datasets.

Figure 4A:
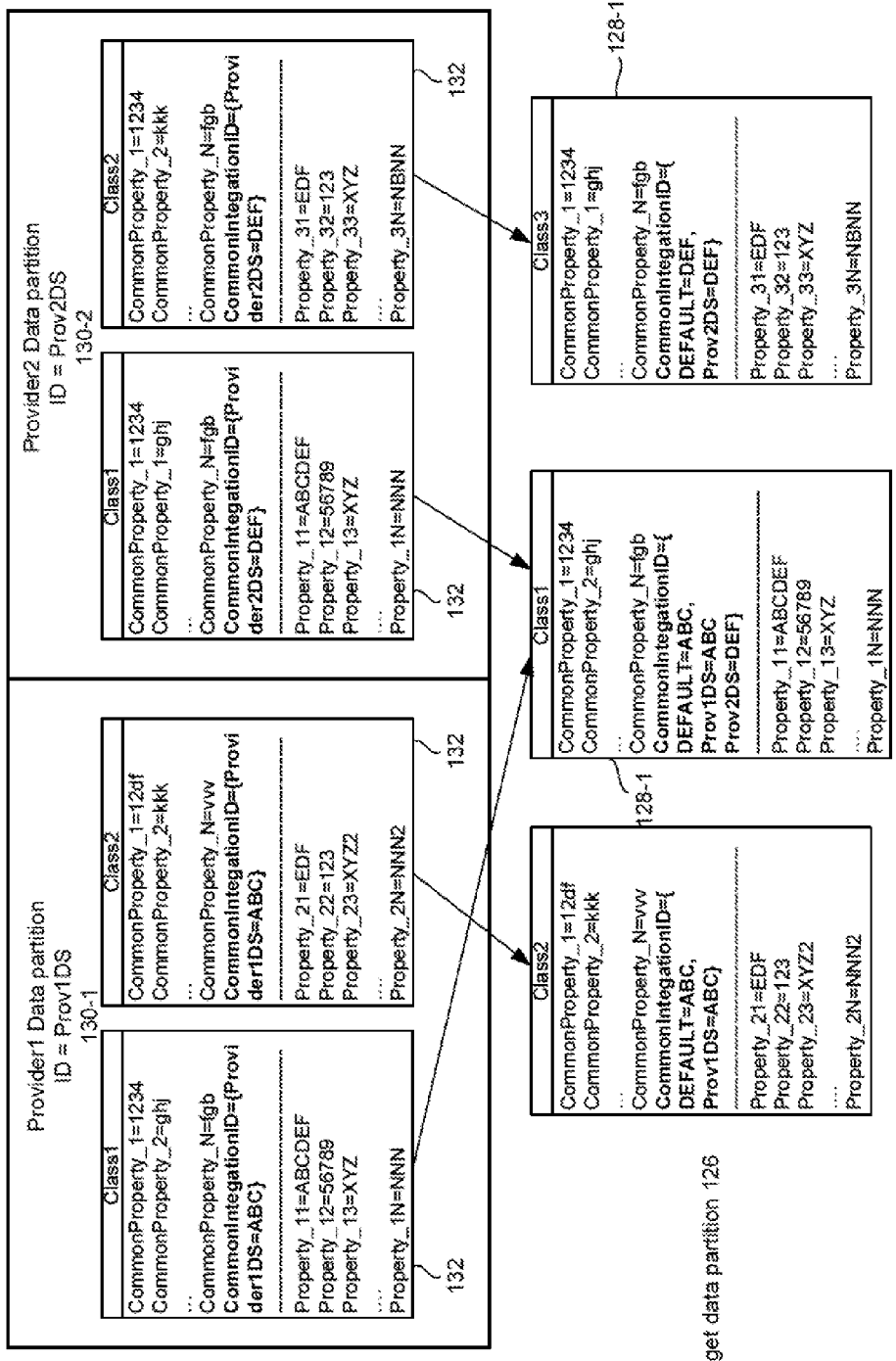
FIG. 4A illustrates the storage of data within the provider data partitions and the target data partition of the system of FIG. 1 using the first storage technique according to an embodiment.

FIG. 4A illustrates the storage of data within the provider data partitions 130 and the target data partition 126 of the system of FIG. 1 using the first storage technique according to another embodiment. Similar to FIG. 3A, the resource objects 132 and the reconciled resource objects 128 of FIG. 4A relate to class objects having a common integration ID attribute. However, FIG. 4A illustrates the storage of data within the class objects according to the first storage technique.

Referring to the first provider data partition 130-1, the class 1 object 132 includes a series of attributes including the common integration ID, e.g., common integration ID={ProviderIDS=ABC}. Also, the second provider data partition 130-2 includes a series of attributes including the common integration ID, e.g., common integration ID={Provider2DS=DEF). The values ABC and DEF refer to the provider-specific data of the common integration ID attribute. In this example, the common integration ID is set as the context-sensitive attribute 104.

Accordingly, the context-sensitive merging unit 138 may merge the first instance of the class 1 object 132 associated with the first data provider 150-1, and the second instance of the class 1 object 132 associated with the second data provider 150-2 because each of these instances relate to the same resource object. As a result, the context-sensitive merging unit 138 may create the reconciled resource object 128-1 associated with the class 1 object. For example, the reconciled resource object 128-1 associated with the class 1 object includes a series of merged attributes including the common integration ID attribute. However, because the common integration ID attribute is set as the context-sensitive attribute 104, the common integration ID attribute of the reconciled claim 1 object 128-1 may include provider-specific data for each of the data providers 150. In other words, the providers-specific data from every data provider 150 is present in the target data partition 126 under the common integration ID attribute. In particular, the common integration ID attribute includes the default data, which corresponds to the results of the reconciliation operation for the common integration ID attribute. Also, the common integration ID includes the provider specific data associated with the first data provider 150-1, and the provider specific data associated with the second data provider 150-2. In particular, the common integration ID attribute includes {Default=ABC, Prov1DS=ABC, Prov2DS=DEF}.

The term Prov1DS identifies the first provider data partition 130-1, and the value ABC corresponds to the common integration ID of the first data provider 150-1. The term Prov2DS identifies the second provider data partition 130-2, and the value DEF corresponds to the common integration ID of the second data provider 150-2. The default data of the common integration ID attribute provides the provider-specific data that corresponds to the results of the merger rules, which, in this case, is the common integration ID value associated with the first data provider 150-1, e.g., ABC.

Figure 4B:
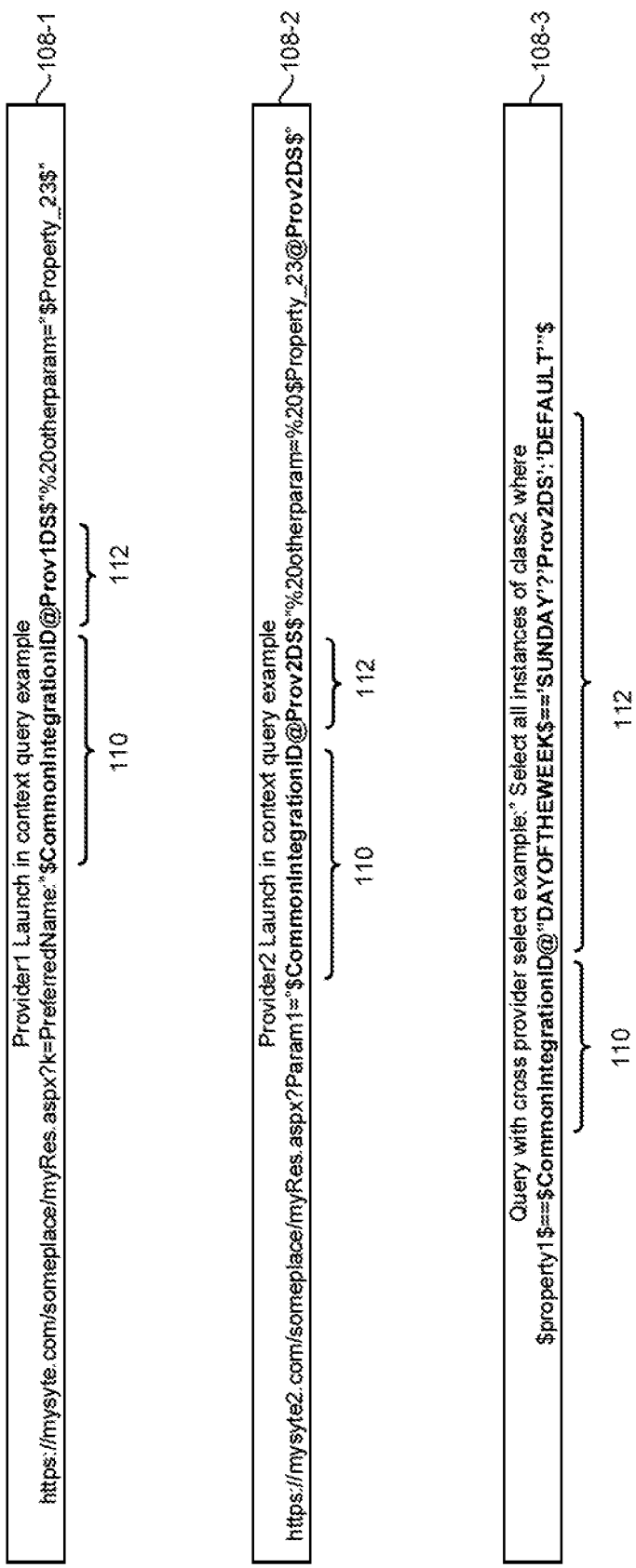
FIG. 4B illustrates example queries to be performed by the context-sensitive query engine of FIG. 1 using the data sets of FIG. 4A according to an embodiment.

FIG. 4B illustrates example queries 108 to be performed by the context-sensitive query engine 122 using the data sets of FIG. 4A according to an embodiment. Similar to the first storage technique of FIG. 2B, the context-sensitive query engine 122 may receive any of the queries 108 (e.g., query 108-1, query 1-8-2, query 108-3 of FIG. 4B), and then retrieve the appropriate provider-specific data using the datasets 124.

In this example, the context-sensitive query engine 122 may receive the first query 108-1, and query the target data partition 126 for the reconciled resource object 128-1 for information as specified by the query parameter 110, which identifies the common integration ID attribute (e.g., the context-sensitive attribute 104). Then, the context-sensitive query engine 122 may obtain the provider-specific data corresponding to the first data provider 150-1 (e.g., the common integration ID of the first data provider 150-1) because the context information 112 specifies the first provider data partition 130-1 (e.g., Prov1DS). In other words, the context-sensitive query engine 122 may locate the appropriate reconciled resource object 128-1, and then obtain the appropriate provider specific data as specified by the context information 112.

Similar to the first query 108-1, the second query 108-2 relates to obtaining provider-specific data corresponding to the common integration ID attribute associated with the second provider 150-2. Because the data retrieval operations of the second query 108-2 are similar to the above describe first query 108-1, the details of the second query 108-2 are omitted for the same of brevity. Also, the third query 108-3 operates in a manner similar to the other queries 108. However, the third query 108-3 uses a condition for the provider. In the example of the third query 108-3, if the day is Sunday, the context-sensitive query engine 122 obtains data from the second data provider 150-2. Otherwise, the context-sensitive query engine 122 uses the default data based on the reconciliation rules. However, the described third query 108-3 is merely a simple conditional query, where the embodiments may encompass more complicated queries including several conditional statements based on the content of the attributes set by different providers in different datasets.

Figure 5:
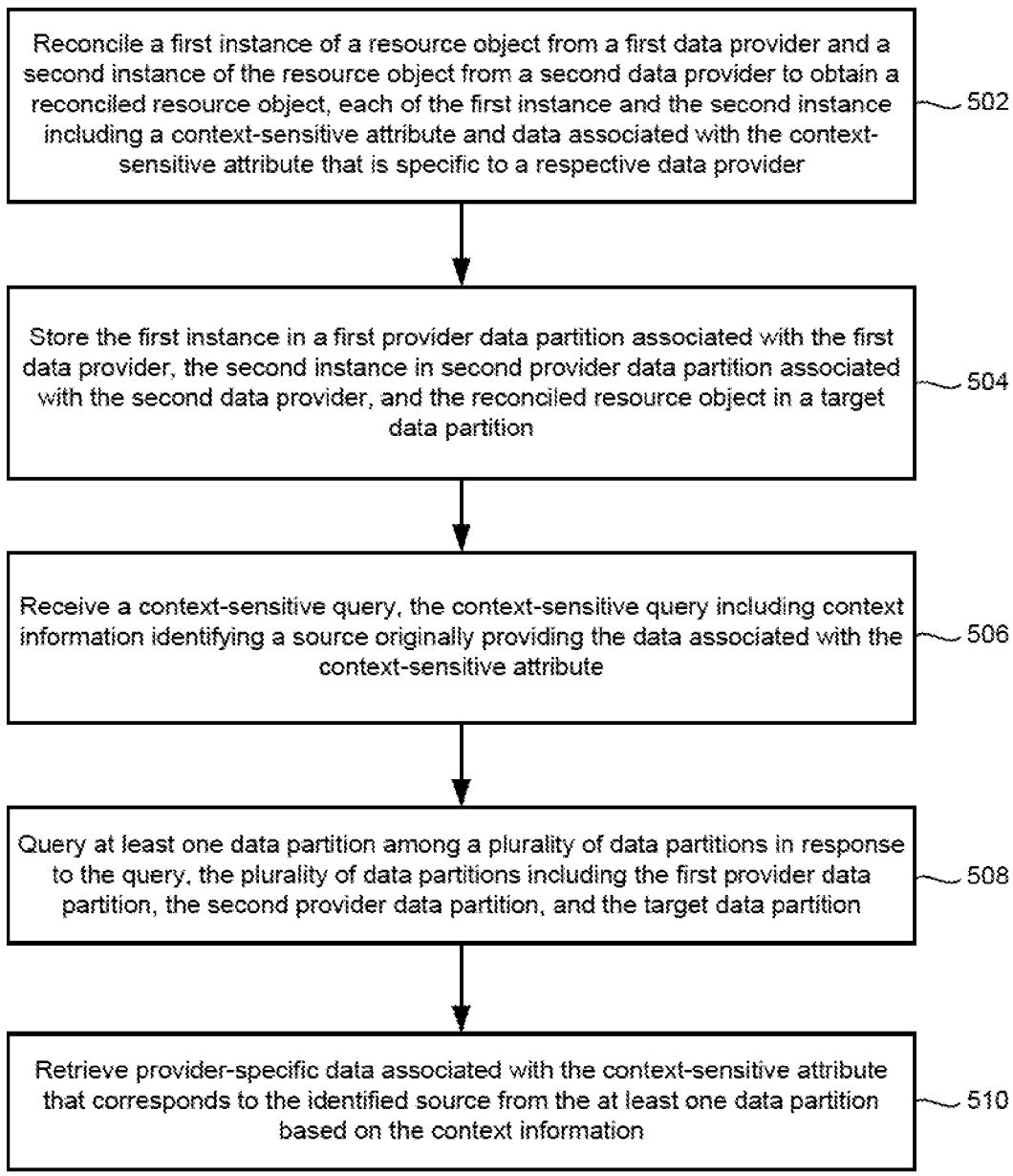
FIG. 5 is a flowchart illustrating example operations of the system of FIG. 1 according to an embodiment.

FIG. 5 is a flowchart illustrating example operations of the system 100 of FIG. 1 according to an embodiment. Although FIG. 5 is illustrated as a sequential, ordered listing of operations, it will be appreciated that some or all of the operations may occur in a different order, or in parallel, or iteratively, or may overlap in time.

A first instance of a resource object from a first data provider and a second instance of the resource object from a second data provider may be reconciled to obtain a reconciled resource object, where each of the first instance and the second instance includes a context-sensitive attribute and data associated with the context-sensitive attribute that is specific to a respective data provider (502). For example, the reconciliation engine 134 may be configured to reconcile a first instance of the resource object 132 and a second instance of the same resource object 132 to obtain the reconciled resource object 128 (e.g., either the reconciled resource object 128-1 according to the first storage technique, or the reconciled resource object 128-2 according to the second storage technique). Each of the first instance and the second instance may include the context-sensitive attribute 104 and data associated with the context-sensitive attribute that is specific to a respective data provider 150 (e.g., Data1 or Data2).

The first instance may be stored in a first provider data partition associated with the first data provider, the second instance may be stored in a second provider data partition associated with the second data provider, and the reconciled resource object may be stored in a target data partition (504). For example, the reconciliation engine 134 may store the first instance in the first provider data partition 130-1 associated with the first data provider 150-1, the second instance in a second provider data partition 130-2 associated with the second data provider 150-2, and the reconciled resource object 128 in the target data partition 126.

A context-sensitive query may be received, where the context-sensitive query includes context information identifying a source originally providing the data associated with the context-sensitive attribute (506). For example, the context-sensitive query engine 122 may receive the query 108, where the query 108 includes the context information 112 identifying a source originally providing the data associated with the context-sensitive attribute 104.

At least one data partition among a plurality of data partitions may be queried in response to the query, where the plurality of data partitions includes the first provider data partition, the second provider data partition, and the target data partition (508). For example, the context-sensitive query engine 122 may query at least one data partition among the plurality of data partitions, where the plurality of data partition includes the first provider data partition 130-1, the second provider data partition 130-2, and the target data partition 126.

Provider-specific data associated with the context-sensitive attribute that corresponds to the identified source may be retrieved from the at least one data partition based on the context information (510). For example, the context-sensitive query engine 122 may be configured to retrieve provider-specific data associated with the context-sensitive attribute 104 that corresponds to the identified source (e.g., Data1 or Data2) from the at least one data partition based on the context information 112.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art.

What is claimed is:

1. A management system comprising:
   at least one processor;
   a non-transitory computer-readable storage medium including instructions executable by the at least one processor, the instructions configured to implement,
   a configuration management database configured to store data in a plurality of data partitions including a first provider data partition a second provider data partition and a tar et data partition;
   a reconciliation engine configured to reconcile a first instance of a resource object from a first data provider and a second instance of the resource object from a second data provider to obtain a reconciled resource object having reconciled data, the first instance and the second instance sharing a common attribute, the common attribute being marked as a context-sensitive attribute, the context-sensitive attribute of the first instance having first provider-specific data specific to the first data provider, the context-sensitive attribute of the second instance having second provider-specific data specific to the second data provider, wherein the reconciliation engine, upon determining that the common attribute is marked as the context-sensitive attribute, is configured to apply a unique reconciliation rule to the first and second instances than what is normally applied to an object without the context-sensitive attribute,
   the reconciliation engine configured store the first instance in the first provider data partition associated with the first data provider, the second instance in the second provider data partition associated with the second data provider, and the reconciled resource object in the target data partition; and
   a context sensitive query engine configured to receive a query including a query parameter identifying data related to the context-sensitive attribute and context information identifying one of the first data provider and the second data provider, the context sensitive query engine configured to query at least one of the data partitions in response to the query, the context sensitive query engine configured to retrieve either the first provider-specific data or the second provider-specific data from the at least one data partition based on the context information.

2. The management system of claim 1, wherein the first and second instances of the resource object and the reconciled resource object share a common key,
   wherein the context sensitive query engine is configured to query the target data partition for the reconciled resource object having the query parameter and obtain the common key from the reconciled resource object,
   wherein the context sensitive query engine is configured to query the first provider data partition for the first instance using the common key when the context information specifies the first data provider, and obtain the first provider-specific data associated with the context-sensitive attribute from the first instance,
   wherein the context sensitive query engine is configured to query the second provider data partition for the second instance using the common key when the context information specifies the second data provider and obtain the second provider-specific data corresponding to the context-sensitive attribute from the second instance.

3. The management system of claim 2, wherein the common key includes a reconciliation identifier.

4. The management system of claim 1, wherein the reconciliation engine includes a context-sensitive merging unit configured to merge the first provider-specific data and the second provider-specific data to create the reconciled data for the reconciled resource object, the reconciled data including the first provider-specific data and the second provider-specific data.

5. The management system of claim 1, wherein the reconciled data includes the first provider-specific data, the second provider-specific data, and default data corresponding to results of a reconciliation operation on the context-sensitive attribute.

6. The management system of claim 1,
   wherein the context sensitive query engine is configured to query the target data partition for the reconciled resource object, and obtain the first provider-specific data from the reconciled data when the context information specifies the first data provider,
   wherein the context sensitive query engine is configured to query the target data partition for the reconciled resource object, and obtain the second provider-specific data from the reconciled data when the context information specifies the second data provider.

7. The management system of claim 1, wherein the reconciliation engine includes a merging unit configured to merge the first provider-specific data and the second provider-specific from the first instance and the second instance.

8. The management system of claim 1, wherein the reconciled data includes only one of the first provider-specific data for the first data provider and the second provider-specific data for the second data provider.

9. The management system of claim 1, wherein the context sensitive query engine is configured to query the target data partition for the reconciled resource object to obtain a reconciliation identifier corresponding to the reconciled resource object,
   wherein the context sensitive query engine is configured to query the first provider data partition when-if the context information specifies the first data provider using the reconciliation identifier and obtain the first provider-specific data from the first instance,
   wherein the context sensitive query engine is configured to query the second provider data partition when the context information specifies the second data provider using the reconciliation identifier and obtain the second provider-specific data from the second instance.

10. A non-transitory computer-readable medium storing instructions that when executed cause at least one processor to:
    reconcile a first instance of a resource object from a first data provider and a second instance of the resource object from a second data provider to obtain a reconciled resource object having reconciled data, the first instance and the second instance sharing a common attribute, the common attribute being marked as a context-sensitive attribute, the context-sensitive attribute of the first instance having first provider-specific data specific to the first data provider, the context-sensitive attribute of the second instance having second provider-specific data specific to the second data provider, wherein upon determining that the common attribute is marked as the context-sensitive attribute, a unique reconciliation rule is applied to the first and second instances than what is normally applied to an object without the context-sensitive attribute;
    store the first instance in a first provider data partition associated with the first data provider, the second instance in a second provider data partition associated with the second data provider, and the reconciled resource object in a target data partition;

receive a query including a query parameter identifying data related to the context-sensitive attribute and context information identifying one of the first data provider and the second data provider;

query at least one data partition among a plurality of data partitions in response to the query, the plurality of data partitions including the first provider data partition, the second provider data partition, and the target data partition; and retrieve either the first provider-specific data or the second provider-specific data from the at least one data partition based on the context information.

11. The non-transitory computer-readable medium of claim 10, wherein the first and second instances of the resource object and the reconciled resource object share a common key, wherein the instructions further include instructions to:

query the target data partition for the reconciled resource object corresponding to the query parameter and obtain the common key from the reconciled resource object;

query the first provider data partition for the first instance using the common key when the context information specifies the first data provider, and obtain the first provider-specific data from the first instance; and query the second provider data partition for the second instance using the common key when the context information specifies the second data provider and obtain the second provider-specific data from the second instance.

12. The non-transitory computer-readable medium of claim 11, wherein the common key includes a reconciliation identifier.

13. The non-transitory computer-readable medium of claim 10, wherein the instructions to reconcile include instructions to:

merge the first provider-specific data and the second provider-specific data from the first instance and the second instance to create the reconciled data including the first provider-specific data for the first data provider, and the second provider-specific data for the second data provider.

14. The non-transitory computer-readable medium of claim 10, wherein the reconciled data includes the first provider-specific data, the second provider-specific data, and default data corresponding to results of a reconciliation operation on the context-sensitive attribute.

15. The non-transitory computer-readable medium of claim 10, wherein the instructions include instructions to:

query the target data partition for the reconciled resource object, and obtain the first provider-specific data from the reconciled data when the context information specifies the first data provider; and query the target data partition for the reconciled resource object, and obtain the second provider-specific data from the reconciled data when the context information specifies the second data provider.

16. The non-transitory computer-readable medium of claim 10, wherein the instructions to reconcile include instructions to:

merge the first provider-specific data and the second provider-specific data from the first instance and the second instance.

17. The non-transitory computer-readable medium of claim 10, wherein the reconciled data includes only one of the first provider-specific data for the first data provider and the second provider-specific data for the second data provider.

18. The non-transitory computer-readable medium of claim 10, wherein the instructions include instructions to:

query the target data partition for the reconciled resource object to obtain a reconciliation identifier corresponding to the reconciled resource object;

query the first provider data partition when the context information specifies the first data provider using the reconciliation identifier and obtain the first provider-specific data from the first instance; and query the second provider data partition when the context information specifies the second data provider using the reconciliation identifier and obtain the second provider-specific data from the second instance.

19. A method comprising:

reconciling, by at least one processor, a first instance of a resource object from a first data provider and a second instance of the resource object from a second data provider to obtain a reconciled resource object having reconciled data, the first instance and the second instance sharing a common attribute, the common attribute being marked as a context-sensitive attribute, the context-sensitive attribute of the first instance having first provider-specific data specific to the first data provider, the context-sensitive attribute of the second instance having second provider-specific data specific to the second data provider, wherein upon determining that the common attribute is marked as the context-sensitive attribute, a unique reconciliation rule is applied to the first and second instances than what is normally applied to an object without the context-sensitive attribute, wherein the reconciling includes, merging the first provider-specific data and the second provider-specific data from the first instance and the second instance to create the reconciled data, the reconciled data including the first provider-specific data for the first data provider, and the second provider-specific data for the second data provider;

storing, by the at least one processor, the first instance in a first provider data partition associated with the first data provider, the second instance in a second provider data partition associated with the second data provider, and the reconciled resource object in a target data partition;

receiving, by the at least one processor, a context-sensitive query, the context-sensitive query including a query parameter related to the context-sensitive attribute and context information identifying one of the first data provider and the second data provider;

querying, by the at least one processor, the target data partition for the reconciled resource object, and obtaining the first provider-specific data from the reconciled data when the context information specifies the first data provider; and querying, by the at least one processor, the target data partition for the reconciled resource object, and obtaining the second provider-specific data from the reconciled data when the context information specifies the second data provider.

20. The method of claim 19, wherein the reconciled data includes the first provider-specific data, the second provider-specific data, and default data corresponding to results of a reconciliation operation on the context-sensitive attribute.

* * * * *

UNITED STATES PATENT AND TRADEMARK OFFICE
CERTIFICATE OF CORRECTION

PATENT NO.       : 9,158,799 B2
APPLICATION NO.  : 13/804694
DATED            : October 13, 2015
INVENTOR(S)      : Vitaly Morozov It is certified that error appears in the above-identified patent and that said Letters Patent is hereby corrected as shown below:

Claims

In column 23, line 9, in claim 1, delete "partition" and insert -- partition, --, therefor.

In column 23, line 9, in claim 1, delete "partition" and insert -- partition, --, therefor.

In column 23, line 10, in claim 1, delete "tar et" and insert -- target --, therefor.

In column 23, line 30, in claim 1, after "configured" insert -- to --.

In column 24, line 27, in claim 7, before "from" insert -- data --.

In column 24, line 38, in claim 9, delete "when-if" and insert -- when --, therefor.

Signed and Sealed this
Fifth Day of April, 2016

Michelle K. Lee
*Director of the United States Patent and Trademark Office*